(12) United States Patent
Packirisamy

(10) Patent No.: US 10,728,422 B1
(45) Date of Patent: Jul. 28, 2020

(54) MULTI-FUNCTION DEVICE AND METHOD FOR SECURE SCANNING

(71) Applicant: XEROX CORPORATION, Norwalk, CT (US)

(72) Inventor: Vinothraja Packirisamy, Thiruvarur (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/247,660

(22) Filed: Jan. 15, 2019

(51) Int. Cl.
  *G06K 15/00* (2006.01)
  *H04N 1/44* (2006.01)
  *H04N 1/00* (2006.01)

(52) U.S. Cl.
  CPC ....... *H04N 1/4413* (2013.01); *H04N 1/00018* (2013.01); *H04N 1/00408* (2013.01); *H04N 1/4486* (2013.01); *H04N 2201/0094* (2013.01)

(58) Field of Classification Search
  CPC .............. H04N 1/4413; H04N 1/4486; H04N 1/00408; H04N 1/00018; H04N 2201/0094; H04N 1/00411; H04N 1/00413
  See application file for complete search history.

(56) References Cited

U.S. PATENT DOCUMENTS

| | | | |
|---|---|---|---|
| 2004/0165723 A1* | 8/2004 | Yoda | H04N 1/00968 380/44 |
| 2004/0184064 A1* | 9/2004 | Takeda | G06F 21/608 358/1.13 |
| 2005/0105722 A1* | 5/2005 | Hashimoto | H04K 1/00 380/51 |
| 2008/0091736 A1* | 4/2008 | Sawayanagi | G06F 21/606 |
| 2011/0238981 A1* | 9/2011 | Nanaumi | H04L 63/0442 713/155 |
| 2016/0219433 A1* | 7/2016 | Naruse | H04W 12/04 |
| 2018/0048464 A1* | 2/2018 | Lim | H04L 9/08 |

* cited by examiner

*Primary Examiner* — Moustapha Diaby
(74) *Attorney, Agent, or Firm* — Jones Robb, PLLC

(57) ABSTRACT

The present disclosure discloses methods and systems providing a secure scanning. A method includes receiving a document for scanning, by a multi-function device, wherein the multi-function device is configured with an identity key, wherein the multi-function device is enabled with a secure scanning feature. An image data corresponding to the document is generated. A scanned document corresponding to the image data is generated. Then, content of the scanned document is encoded with the identity key of the multi-function device, to secure the content in the scanned document, wherein the content of the scanned document is accessible only at a device having the identity key. The device can be the same multi-function device that encodes the content of the scanned document. The device can be a different multi-function device but configured with the same identity as of the multi-function device.

35 Claims, 10 Drawing Sheets

MULTI-FUNCTION DEVICE AND METHOD FOR SECURE SCANNING

TECHNICAL FIELD

The present disclosure relates to the field of scanning, more specifically, relates to methods and systems for providing secure scanning.

BACKGROUND

Multi-functional devices (MFD's), copiers, printers, scanners, fax machines, and other digital imaging processing systems, often include a scanning functionality that permits a user to scan paper documents, and send them electronically to e-mail recipients, network folders, FTP servers, and other MFDs on the network. Currently, these devices provide password-based secure scanning feature. In the password-based secure scanning feature, a user sets a password for his scanned document and uses the set password to access the scanned document. However, password protection technology offers less data protection and still there is a possibility that confidential data can be leaked. For example, the scanned output can be misused if the user shares the password with another user or if the password is hacked. In this manner, confidential data gets leaked out. In today's time, where data is of utmost important for every user, organization, or industry, there is a need for efficient methods and systems for protecting scanned documents.

SUMMARY

According to aspects illustrated herein, there is a method for providing a secure scanning. The method includes receiving a document for scanning, by a multi-function device, wherein the multi-function device is configured with an identity key, wherein the multi-function device is enabled with a secure scanning feature. An image data corresponding to the document is generated. A scanned document corresponding to the image data is generated. Finally, content of the scanned document is encoded using the identity key of the multi-function device, to secure the content in the scanned document, wherein the content of the scanned document is accessible at the same multi-function device.

According to further aspects illustrated herein, a method for accessing a secured scanned document is disclosed. The method includes receiving a secured scanned document by a multi-function device, wherein content of the secured scanned document is encoded with an identity key. It is checked whether the multi-function device is configured with the same identity key. Based on the check, the content of the secured scanned document is decoded using the same identity key. Finally, access to the content of the secured scanned document is allowed at the multi-function device only when the multi-function device decodes the content of the secured scanned document successfully.

According to furthermore aspects illustrated herein, a multi-function device for providing a secure scanning is disclosed. The multi-function device includes a user interface, a scanner having a scan data generator and a controller having a scan file generator and a secure scanning module. The user interface is provided to a user for enabling a secure scanning feature. The scan data generator is for generating an image data upon scanning a document. The scan file generator is for generating a scanned document corresponding to image data received from the scanner. The secure scanning module is for encoding content of the scanned document with an identity key configured with the multi-function device, wherein the content of the scanned document is accessible at the same multi-function device or at a different multi-function device configured with the same identity key.

According to furthermore aspects herein, a multi-function device for accessing a secured scanned document is disclosed. The multi-function device includes a receiver and a controller. The receiver is for receiving a secured scanned document, wherein content of the secured scanned document is encoded with an identity key. The controller is for checking whether the multi-function device is configured with the same identity key; based on the check, decoding the content of the secured scanned document using the identity key; and allowing access to the content of the secured scanned document at the multi-function device only when the multi-function device decodes the content of the secured scanned document successfully.

According to additional aspects illustrated herein, a system including a first multi-function device and a second multi-function device, is disclosed. The first multi-function device is configured with an identity key, the first multi-function device is enabled with secure scanning feature, wherein the first multi-function device is for generating a scanned document corresponding to a document received for scanning; encoding content of the scanned document with the identity key, to secure the content in the scanned document, resulting in a secured scanned document; and transmitting the secured scanned document to a second multi-function device for at least one of storage and later retrieval. The second multi-function device is for receiving the secured scanned document from the first multi-function device; checking whether the second multi-function device is configured with the same identity key as of the first multi-function device; based on the check, decoding the content of the secured scanned document using the same identity key; and allowing access to the content of the secured scanned document at the second multi-function device only when the content of the secured scanned document is decoded successfully.

According to additional aspects illustrated herein, a system is disclosed. The system includes a multi-function device and a server. The multi-function device is configured with an identity key and is enabled with a secure scanning feature. The multi-function device is for receiving a document for scanning; generating an image data corresponding to the document; generating a scanned document corresponding to the image data. The server is communicatively coupled to the multi-function device. The server is for receiving the scanned document from the multi-function device; upon receiving, encoding content of the scanned document using the identity key of the multi-function device, to secure the content in the scanned document; and allowing access to the content of the scanned document when the scanned document is accessed at the multi-function device.

A non-transitory computer-readable medium comprising instructions executable by a processing resource to receive a document for scanning, by a multi-function device, wherein the multi-function device is configured with an identity key, wherein the multi-function device is enabled with a secure scanning feature; generate an image data corresponding to the document; generate a scanned document corresponding to the image data; and encode content of the scanned document using the identity key of the multi-function device, to secure the content in the scanned document, wherein the content of the scanned document is accessible at the multi-function device.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
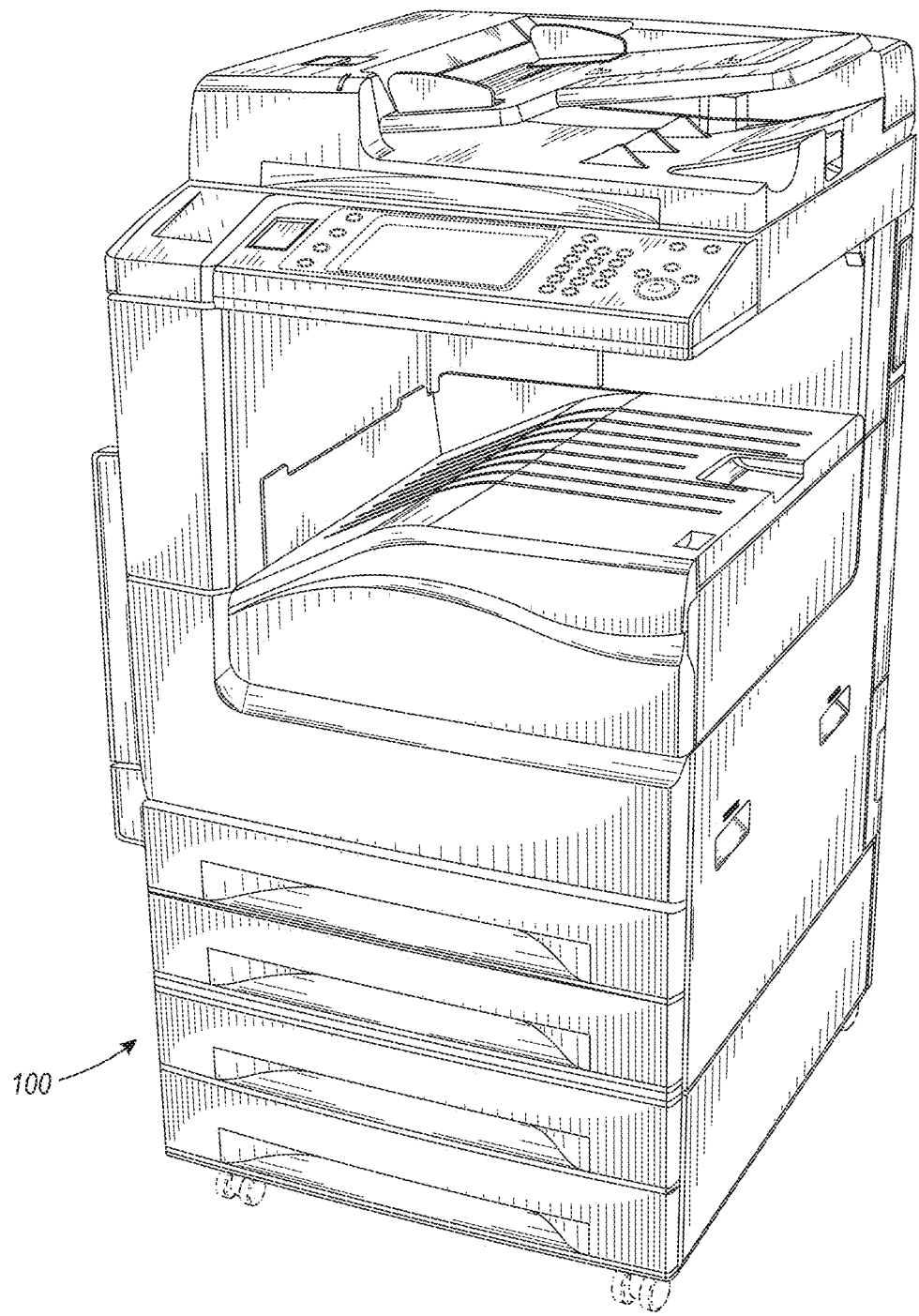
FIG. 1 shows an exemplary physical multi-function device.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity and are intended to include more examples than just provided below.

The term "multi-function device" refers to a device or a combination of multiple devices configured to perform one or more functions, but not limited to, scanning, printing, copying, imaging, and so forth. The multi-function device includes software, hardware, firmware, or combination thereof. In context of the current disclosure, the multi-function device includes a secure scanning feature and is configured with an identity key. The secure scanning feature protects/secures a scanned document such that access to/of the scanned document is limited to a device such as—the multi-function device which secures the scanned document, or a different multi-function device but configured with the same identity key as of the multi-function device that secures the scanned document. The multi-function device secures the scanned document by encoding content of the scanned document or the scanned document using the identity key of the multi-function device.

The term "identity key" refers to a key that identifies the multi-function device or an environment that is used to secure the scanned document. The identity key may be a numeric code, an alphabetic code, an alphanumeric code and so on. The identity key is set in the multi-function device at the first time during installation or may be set at later stages.

The term "document" refers to any document related to a user or to an organization. The document can be in physical form, such as printed on paper. The document includes confidential data/content or sensitive user information. The confidential content may be in the form of text, image, graphics, or a combination thereof. The document may also be termed as a source document or an input document. The document is provided as an input to the multi-function device. The document may be any document that needs to be secured.

A "scanned document" is an output obtained after scanning the document. The scanned document is in a virtual or software form (embodied in a software file). The virtual form can also be referred to as digital form, electronic version or the like. The scanned document may also be termed as a scanned output file. The scanned document generated in the present disclosure is a secured scanned document thus, may be called as a secured scanned document.

The term "first multi-function device" refers to a multi-function device which scans the document and encodes the content of the scanned document using the identity key. The first multi-function device sends the secured scanned document to another multi-function device, referred to as a second multifunction device. The "second multi-function device" receives the secured scanned document from the first multi-function device. The second multi-function device receives the secured scanned document for storage, print display, or other purpose.

EXEMPLARY EMBODIMENTS

A method providing a secure scanning is disclosed. The method includes receiving a document for scanning, by a multi-function device, wherein the multi-function device is configured with an identity key, wherein the multi-function device is enabled with a secure scanning feature. An image data corresponding to the document is generated. A scanned document corresponding to the image data is generated. Finally, content of the scanned document is encoded using the identity key of the multi-function device, to secure the content in the scanned document, wherein the content of the scanned document is accessible at the same multi-function device.

The method includes configuring the multi-function device with the identity key. The method includes storing the scanned document for later retrieval and/or access. The method includes allowing access to the content of the scanned document at the multi-function device. The method includes decoding the content of the scanned document at the multi-function device. The method includes allowing access to the content of the scanned document at a different multi-function device configured with the identity key.

The method includes transmitting the scanned document to one or more multi-function devices. The method includes allowing access to the content of the scanned document at the one or more multi-function devices, if the one or more multi-function devices are configured with the same identity key. The method includes decoding the content of the scanned document using the identity key, if the one or more multi-function devices are configured with the same identity key. The method includes disallowing access to the content of the scanned document at the one or more multi-function devices, if the one or more multi-function devices are not configured with the identity key. The method includes displaying a message if access to the content of the scanned document is disallowed.

In an example, allowing access to the content of the scanned document includes displaying the content and/or printing the content.

A method for accessing a secured scanned document is disclosed. The method includes receiving a secured scanned document by a multi-function device, wherein content of the secured scanned document is encoded with an identity key. It is checked whether the multi-function device is configured with the same identity key. Based on the check, the content of the secured scanned document is decoded using the same identity key. Finally, access to the content of the secured scanned document is allowed at the multi-function device only when the multi-function device decodes the content of the secured scanned document successfully.

The method includes disallowing access to the content of the secured scanned document, when the multi-function device is not configured with the same identity key. The method includes printing the content of the secured scanned document when the secured scanned document is decoded successfully. The method includes displaying the content of the secured scanned document when the secured scanned document is decoded successfully. The method includes storing the secured scanned document at the multi-function device.

A multi-function device for providing a secure scanning is disclosed. A user interface is provided to a user, for enabling a secure scanning feature. A scanner includes a scan data generator for generating an image data, upon scanning a document. A controller having a scan file generator for generating a scanned document corresponding to the image data received from the scanner. The controller includes a secure scanning module for encoding content of the scanned document with the identity key, to secure the content in the scanned document, wherein the content of the scanned document is accessible at the multi-function device or at a different multi-function device configured with the same identity key.

The controller allows access to the content of the scanned document at the multi-function device, when the scanned document is accessed at the multi-function device.

The multi-function device includes a memory for storing the scanned document for later retrieval and/or access. The secure scanning module decodes the content of the scanned document using the identity key. The multi-function device includes a transmitter for transmitting the scanned document to one or more multi-function devices, communicatively coupled to the multi-function device. Access to content of the scanned document is allowed at the one or more multi-function devices, if the one or more multi-function devices are configured with the identity key. The one or more multi-function devices decode the content of the scanned document using the unique identity key, if the one or more multi-function devices are configured with the identity key. Access to content of the scanned document is disallowed at the one or more multi-function devices, if the one or more multi-function devices are not configured with the identity key. The one or more multi-function devices display a message if access to the content of the scanned document is disallowed.

A multi-function device for accessing a secured scanned document is disclosed. The multi-function device includes a receiver and a controller. The receiver is for receiving a secured scanned document, wherein content of the secured scanned document is encoded with an identity key. The controller is for checking whether the multi-function device is configured with the same identity key; based on the check, decoding the content of the secured scanned document using the identity key; and allowing access to the content of the secured scanned document at the multi-function device only when the multi-function device decodes the content of the secured scanned document successfully.

The controller disallows access to the content of the secured scanned document at the multi-function device, when the multi-function device is not configured with the same identity key. The controller allows printing the content of the secured scanned document when the secured scanned document is decoded successfully. The controller displays the content of the secured scanned document via a user interface, when the secured scanned document is decoded successfully. The multi-function device includes a memory for a memory for storing the secured scanned document at the multi-function device.

A system including a first multi-function device and a second multi-function device is disclosed. The first multi-function device is configured with an identity key, the first multi-function device is enabled with secure scanning feature, wherein the first multi-function device is for generating a scanned document corresponding to a document received for scanning; encoding content of the scanned document with the identity key, to secure the content in the scanned document, resulting in a secured scanned document; and transmitting the secured scanned document to a second multi-function device for at least one of storage and later retrieval. The second multi-function device is for receiving the secured scanned document from the first multi-function device; checking whether the second multi-function device is configured with the same identity key as of the first multi-function device; based on the check, decoding the content of the secured scanned document by the second multi-function device, using the same identity key; and allowing access to the content of the secured scanned document at the second multi-function device only when the content of the secured scanned document is decoded successfully.

The second multi-function device is for displaying the content of the secured scanned document only when the second multi-function device decodes the content of the secured scanned document successfully. The second multi-function device is for printing the content of the secured scanned document only when the second multi-function device decodes the content of the secured scanned document successfully. The first multi-function device is for storing the secured scanned document for later retrieval and/or access.

A system includes a multi-function device and a server. The multi-function device is configured with an identity key and is enabled with a secure scanning feature, the multi-function device is for receiving a document for scanning; generating an image data corresponding to the document; generating a scanned document corresponding to the image data. The server is communicatively coupled to the multi-function device, the server is for receiving the scanned document from the multi-function device; upon receiving, encoding content of the scanned document using the identity key of the multi-function device, to secure the content in the scanned document; and allowing access to the content of the scanned document when the scanned document is accessed at the multi-function device.

The server allows access to the content of the scanned document when the scanned document is accessed at a different multi-function device configured with the same identity key.

A non-transitory computer-readable medium implementing the subject matter includes instructions executable by a processing resource. The instructions are executed to receive a document for scanning, by a multi-function device, wherein the multi-function device is configured with an identity key, wherein the multi-function device is enabled with a secure scanning feature. The instructions are executed to generate an image data corresponding to the document is generated. The instructions are executed to generate a scanned document corresponding to the image data. Finally, the instructions are executed to encode content of the scanned document using the identity key of the multi-function device, to secure the content in the scanned document, wherein the content of the scanned document is accessible at the multi-function device.

The non-transitory computer-readable medium includes instructions executable by the processing resource to configure the multi-function device with the identity key. The non-transitory computer-readable medium includes instructions executable by the processing resource to store the scanned document for later retrieval and/or access. The non-transitory computer-readable medium includes instructions executable by the processing resource to allow access to the content of the scanned document at the multi-function device. The non-transitory computer-readable medium includes instructions executable by the processing resource to decode the content of the scanned document at the multi-function device using the identity key. The non-transitory computer-readable medium includes instructions executable by the processing resource to allow access to the content of the scanned document at a different multi-function device configured with the same identity key. The non-transitory computer-readable medium includes instructions executable by the processing resource to transmit the scanned document to one or more multi-function devices. The non-transitory computer-readable medium includes instructions executable by the processing resource to allow access to the content of the scanned document at the one or more multi-function devices, if the one or more multi-function devices are configured with the same identity key. The non-transitory computer-readable medium includes instructions executable by the processing resource to decode the content of the scanned document using the identity key, if the one or more multi-function devices are configured with the same identity key. The non-transitory computer-readable medium includes instructions executable by the processing resource to disallow access to the content of the scanned document at the one or more multi-function devices, if the one or more multi-function devices are not configured with the identity key. The non-transitory computer-readable medium includes instructions executable by the processing resource to display a message if access to the content of the scanned document is disallowed.

A non-transitory computer-readable medium implementing the subject matter includes instructions executable by a processing resource. The instructions are executed to receive a secured scanned document by a multi-function device, wherein content of the secured scanned document is encoded with an identity key. The instructions are executed to check whether the multi-function device is configured with the same identity key. The instructions are executed to based on the check, decode the content of the secured scanned document using the same identity key. The instructions are executed to allow access to the content of the secured scanned document at the multi-function device only when the multi-function device decodes the content of the secured scanned document successfully.

The non-transitory computer-readable medium includes instructions executable by the processing resource to disallow access to the content of the secured scanned document, when the multi-function device is not configured with the same identity key. The non-transitory computer-readable medium includes instructions executable by the processing resource to print the content of the secured scanned document when the secured scanned document is decoded successfully. The non-transitory computer-readable medium includes instructions executable by the processing resource to display the content of the secured scanned document when the secured scanned document is decoded successfully. The non-transitory computer-readable medium includes instructions executable by the processing resource to store the secured scanned document at the multi-function device.

Overview

The present disclosure discloses methods and systems for providing secure scanning feature. More specifically, the methods and systems secure a scanned document using an identity key of a device such as a multi-function device. The scanned document is secured such that the scanned document is only accessible at the multi-function device using which the scanned document is secured or by a different multi-function device but configured with the same identity key as of the multi-function device. The use and access to the scanned document is restricted or locked to the multi-function device and thereby enhancing security of the scanned document. In this manner, the scanned document can only be accessed within an organization and cannot be misused by any other user outside the organization.

The secure scanning feature includes securing the scanned document by encoding the scanned document by the multi-function device using the identity key and allowing access to the scanned document at a device having the same identity key. The scanned document is encoded with the identity key that identifies the multi-function device or an environment in which the document is scanned. The scanned document can then only be printed/accessed at/to devices that match up with the identity key.

The aim of the present disclosure is to secure confidential data and adds more protection to scanned documents. The present disclosure may be implemented for high-security environments where strict control of documents is required. For example, the present disclosure can be implemented for various domains/industries such as defence, research, medical, government, banking or any other domains, where the confidential content needs to be maintained in a secure manner. These are just few examples, but the present disclosure can be implemented for any environments/organizations where there is a need to secured scanned documents.

Exemplary Physical Multi-Function Device

FIG. 1 discloses an exemplary physical multi-function device 100 for implementing the current disclosure. These days, the multi-function device 100 is commonly available in organizations for printing, scanning, copying, faxing, or a combination thereof. A user (although not shown) uses the multi-function device 100 for his day-to-day activities related to printing, scanning, copying and so on. As shown, the multi-function device 100 is a standalone device, but the multi-function device 100 may be a part of network communicatively coupled to other multi-function devices as shown in FIGS. 3B and 4B. In place of the multi-function device 100, the disclosure may include, a multi-function peripheral device, a scanner, a multi-function printer and so on.

In context of the current disclosure, the multi-function device 100 is, i) configured with an identity key, and ii) includes a secure scanning feature. The secure scanning feature secures a scanned document using the identity key of the multi-function device 100. By default, the secure scanning feature is enabled at the multi-function device 100. In some cases, the user may enable the secure scanning feature at the time of scanning the document. The multi-function device 100 scans a document and generates a secured scanned document. The scanned document may include, but not limited to, a Portable Document Format (PDF), a Tag Image File Format (TIFF) or other known formats or developed later. The scanned document is secured such that the scanned document is accessible only at the multi-function device 100, i.e., the multi-function device 100 using which the scanned document is secured. Alternatively, the scanned document is accessible at a different multi-function device (although not shown) but configured with the same identity key as of the multi-function device 100. In other words, the scanned document is accessible at the authorized multi-function device and/or within the organization. The authorized multi-function device includes the multi-function device 100 and/or a multi-function device configured with the identity key of the multi-function device 100. Thus, access or usage of the scanned document is limited to the multi-function device 100 or a multi-function device with the same identity key.

The scanned document is secured by encoding the scanned document using the identity key of the multi-function device 100 and encoding the scanned document is an internal completely internal process handled by the multi-function device 100 itself so that only particular multi-function device, i.e., the multi-function device 100 is able to decode it using the same identity key and without any external key/password. The protection offered here does not require any authentication from the user and the scanned document is secured without having any user knowledge. The scanned document is secured such that content of the scanned document is accessible only by a device using which the content is secured or by any other similar device which is configured using the same identity key. Even if an unintended user receives the scanned document and tries to access the scanned document using any device such as his mobile device or other devices present in the organization, he is not able to access the scanned document. As a result, the scanned document is secured and thus cannot be used outside the device, other than multi-function device, i.e., multi-function device 100 and/or location or the environment where the multi-function device 100 is present.

The identity key as mentioned above can be configured in the multi-function device 100 and the identity key configuration is one-time process. The identity key can be set in the multi-function device 100 at the time of manufacturing or can be set in a software setting at the time of installation of software. The identity key may be MAC address, serial number, network ID, domain name, organization name, organization ID, a combination thereof. The identity key may be an internal secure code set by an admin. The identity key may be a combination of alphabets, numbers, special characters, or a combination thereof. The identity key can be set by a manufacturer of the multi-function device 100 or an admin user of the multi-function device 100, but the identity key is unknown to other users of the multi-function device 100. Other users include users who typically use the multi-function device 100 and have different rights than admin users.

Exemplary Flow Diagrams

Figure 2A:
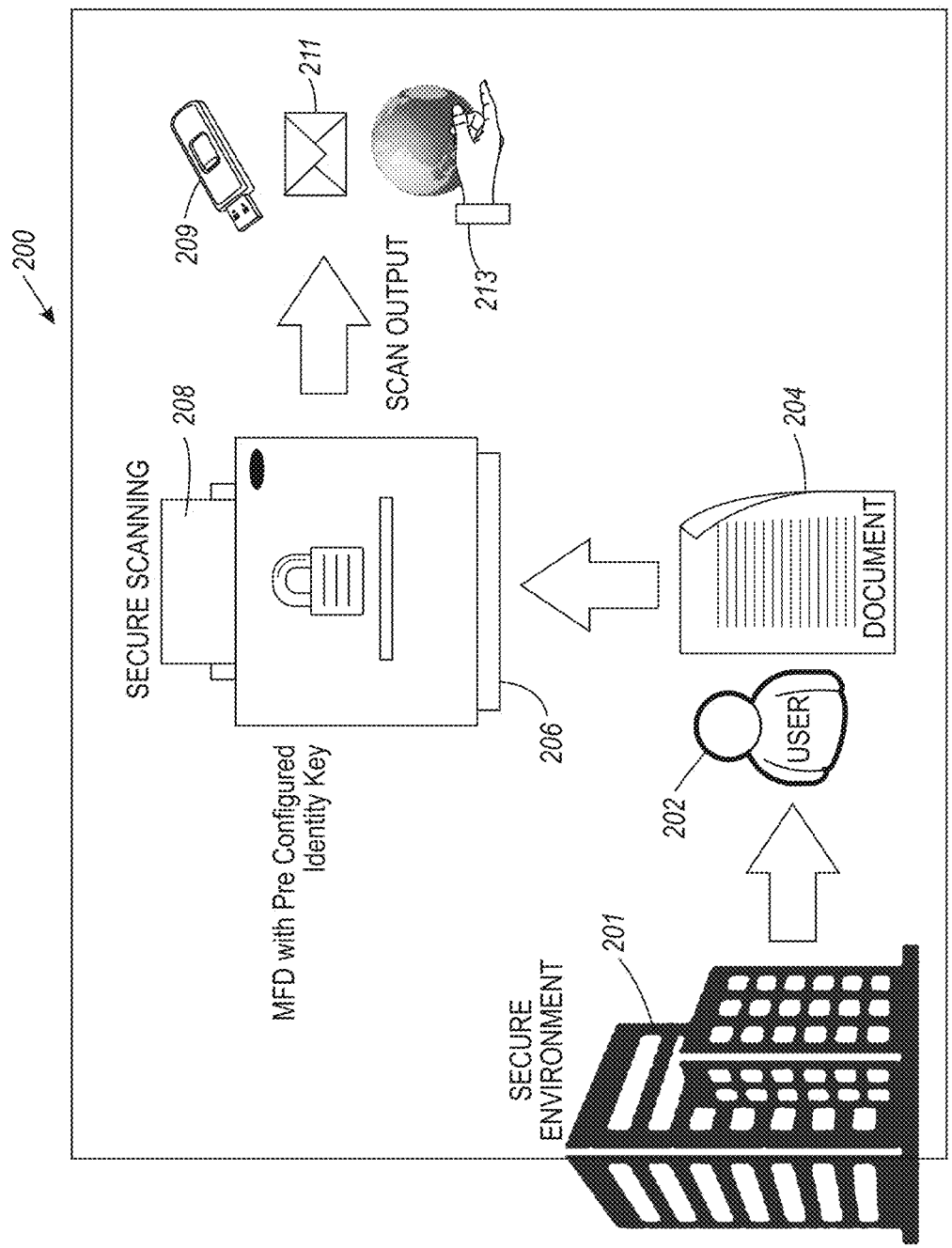
FIGS. 2A and 2B illustrate exemplary flow diagrams.

FIG. 2A shows a flow diagram 200 depicting a secure environment 201 including a user 202, a document 204, a multi-function device 206 pre-configured with an identity key and a scanned document 208. In the secure environment 201, confidential data/content is of utmost important and thus it becomes essential to secure documents that are scanned. As shown, the user 202 submits the document 204 to the multi-function device 206 for scanning. Upon scanning, the multi-function device 206 generates the scanned document 208. The scanned document 208 generated by the multi-function device 206 is secured using the configured identity key of the multi-function device 206. Meaning the scanned document 208 is only accessible at a particular multi-function device having the identity key, i.e., the device 206. If the user 202 wishes to access the scanned document 208, the user 202 accesses the scanned document at the device 206. The scanned document 208 can be shared by the user 202 in multiple ways such as via email 211, in a personal storage device 209 or in a virtual server 213. For emails, the user 202 submits his email address via a user interface and the scanned document 208 is sent to the user 202 at his email (indicated as 211). In another example, the user 202 can store the scanned document 208 in a personal storage device such as a pen drive (indicated as 209). In further, example, the user 202 can store the scanned document 208 in a virtual server (indicated as 213).

Figure 2B:
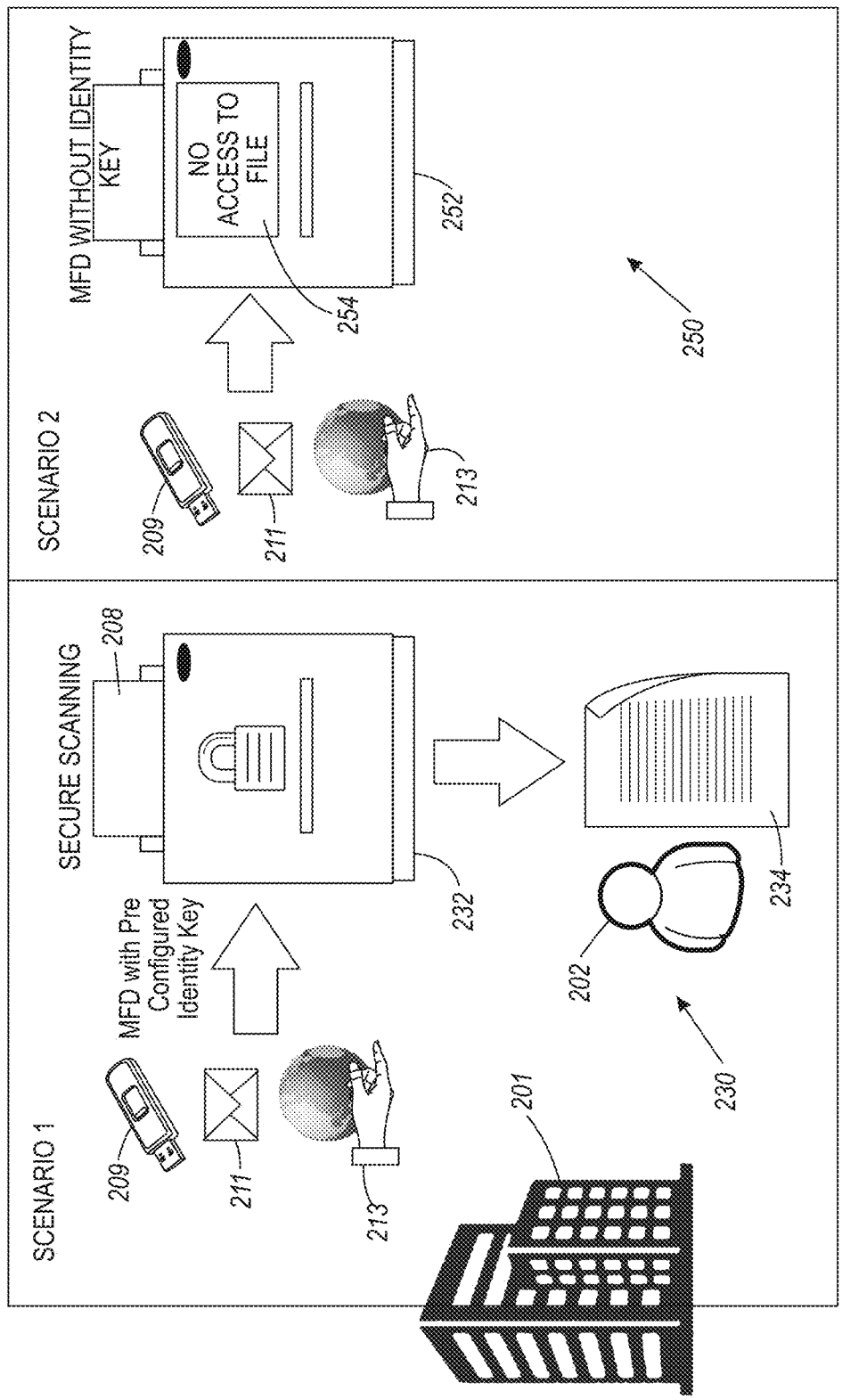

It is further considered that the user 202 wishes to access the scanned document 208 at a later hour. Specifically, the user 202 wishes to print the scanned document 208 and further the user 202 submits the scanned document 208 for printing. The user 202 can submit the scanned document 208 for printing through any methods such as pen drive 209, email 211, or virtual server 213. For example, the user 202 can connect the pen drive 209 to a multi-function device 232 (refer to FIG. 2B) and selects the scanned document 208 for printing. The user 202 can send the scanned document 208 to the multi-function device 232 via his email. The user 202 further can submit the scanned document 208 via virtual server 213. The scanned document is submitted for printing to the multi-function device 232. As depicted, the multi-function device 232 is configured with the identity key same as of the device 206. Upon receiving, the multi-function device 232 identifies the scanned document 208 is encoded or secured and determines that the multi-function device 232 is configured with identity key. Using the configured key, the multi-function device 232 decodes the scanned document 208 and accesses the content of the scanned document 208. Finally, the scanned document 208 is successfully printed by the multi-function device 232 as shown in scenario 1 indicated as 230 of FIG. 2B. The printed scanned document is shown as 234.

In scenario 2 of FIG. 2C, (indicated as 250), the user 202 submits the scanned document 208 to a multi-function device 252, the multi-function device 252 is not having the identity key as required. The scanned document for printing can be submitted through methods such as 209, 211, or 213. For example, the user 202 can connect the personal storage device 209 to the multi-function device 252 and selects the scanned document 208 for printing. The user 202 can send the scanned document 208 to the multi-function 252 via his email. The user 202 further can submit the scanned document 208 via virtual server 213. Upon receiving, the multi-function device 252 identifies the scanned document 208 is encoded or secured and determines that the multi-function device 252 does not have the required identity key. Thus, the multi-function device 252 cannot decode the scanned document 208 and thus, cannot access the content of the scanned document 208. As a result, a notification is generated by the multi-function device 252 indicating 254 "no access to file." Hence, multi-function devices such as 252 without the identity cannot access the content of the scanned document 208.

Exemplary Environments

Figure 3A:
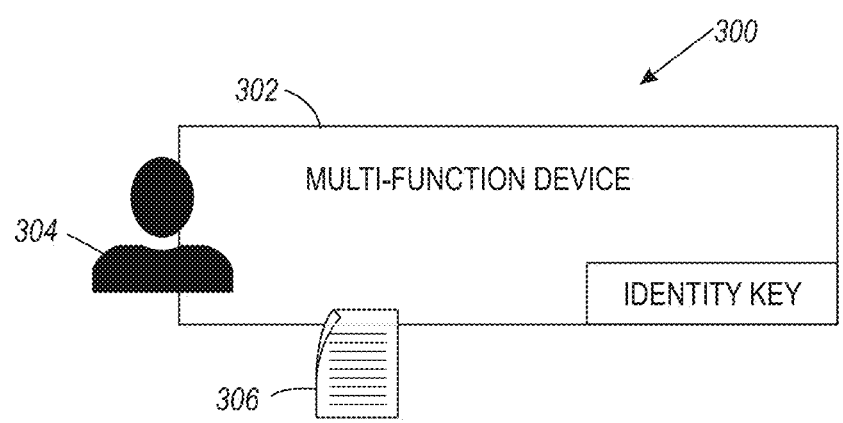
FIGS. 3A and 3B illustrate exemplary environments in which various embodiments of the disclosure can be practiced.
Figure 3B:
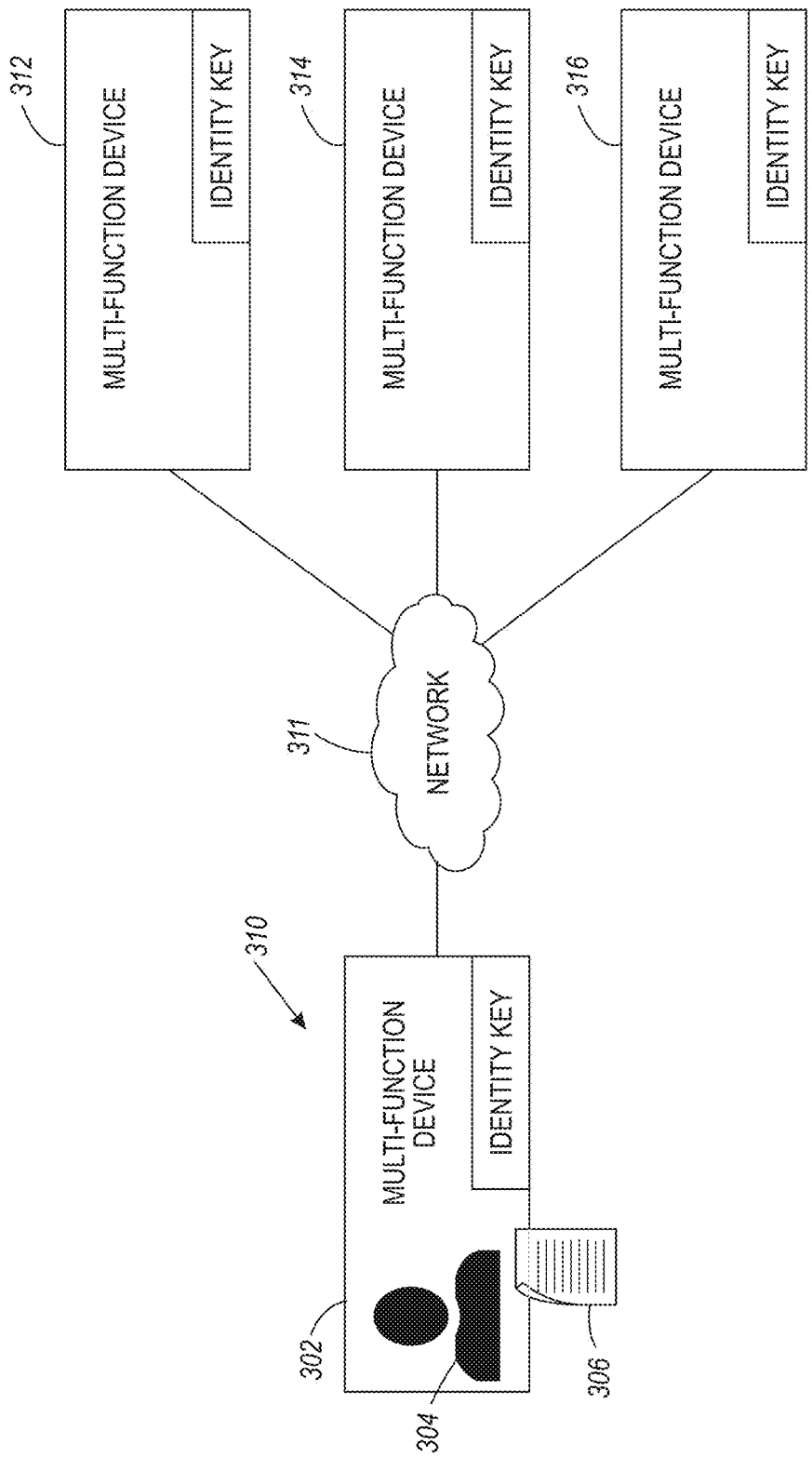

FIG. 3A is an exemplary environment 300 in which various embodiments of the disclosure can be practiced. The environment 300 represents an organization where a single multi-function device is present such as a multi-function device 302. Various examples of the multi-function device 300 include, but not limited to, a multi-function peripheral (MFP), a scanner, or any equivalent device with scanning and printing functionality. Generally, users such as a user 304 uses the multi-function device 302 for his day-to-day activities such as printing, scanning, copying, faxing, or a combination thereof. In context of the current disclosure, the user 304 uses the multi-function device 302 for scanning a document 306 such as a confidential document. The multi-function device 302 protects/secures the scanned document as discussed above resulting in a secured scanned document. After the scanned document is generated, the scanned document may be stored in the environment 300, i.e., at the multi-function device 302. In other examples, the scanned document may be transmitted to other multi-function devices. The scanned document can be transmitted to the user 304 via email. The scanned document can be stored in a personal storage device of the user 304 such as a pen drive. According to the implementations of FIG. 3A, if the user 304 wishes to access the secured scanned document, the secured scanned document can only be accessed at the multi-function device 302 by the user 304. To provide access to the content, the multi-function device 302 decodes the scanned document, and provides access to the scanned document. In this manner, the scanned document is secured and cannot be used by any other device/location and thus, the scanned document is inaccessible even if intercepted by an unintended recipient outside of the multi-function device 302 or the environment 300. The scanned document cannot be accessed or printed in another environment even if the identity key is known as the user 304 or another user requires the multi-function device 302 to access the scanned document.

FIG. 3B represents another exemplary environment 310 in which various embodiments of the disclosure can be practiced. The environment 310 represents an organization where one or more multi-function devices such as 302, 312, 314, 316 are present. The multi-function devices 302, 312, 314, and 316 may be present at a single location. While in other example, the multi-function devices 302, 312, 314, and 316 may be distributed geographically. The multi-function devices 302, 312, 314, and 316 can be connected in the same network or via different network. The multi-function devices 302, 312, 314, and 316 may be communicatively coupled to each other via a network 311. The communication network 311 may be a wireless network, a wired network or a combination thereof. The communication network 311 may be implemented as one of the different types of networks, such as intranet, Local Area Network (LAN), Wide Area Network (WAN), the Internet, and the like. The communication network 311 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. The communication network 311 may include a variety of network devices, including routers, bridges, servers, computing devices, storage devices, and the like.

In the shown environment 310, each multi-function device 302, 312, 314, and 316 is configured with the identity key. The user 304 scans the document using any multi-function device say multi-function device 302. Upon scanning, the multi-function device 302 automatically encodes the scanned document using the identity key. The scanned document is accessible at the multi-function device 302 by default as the multi-function device 302 encoded the scanned document. The user 304 sends the scanned document to a multi-function device say multi-function device 312. According to implementations of FIG. 3B, the scanned document is also accessible at the multi-function device 312. The multi-function device 312 decodes the scanned document and provides access to the scanned document at the multi-function device 312. In addition, the scanned document is accessible at the multi-function devices such as 314 and 316 along with devices 302 and 312 as each multi-function device 314 and 316 is configured with the same identity key. According to the implementations of FIG. 3B, the user 304 can access content of the scanned document using any multi-function devices 312, 314 and 316 present in the network and configured with the same identity key as of the device 302.

In the environment 300 or 310, the scanned document can be sent to other users or stored in any desired manner. But to access the scanned document, every user requires the multi-function device that encodes the scanned document or any other multi-function device configured with the identity key that is used for securing the scanned document or the identity key of the multi-function device.

Exemplary System

Figure 4A:
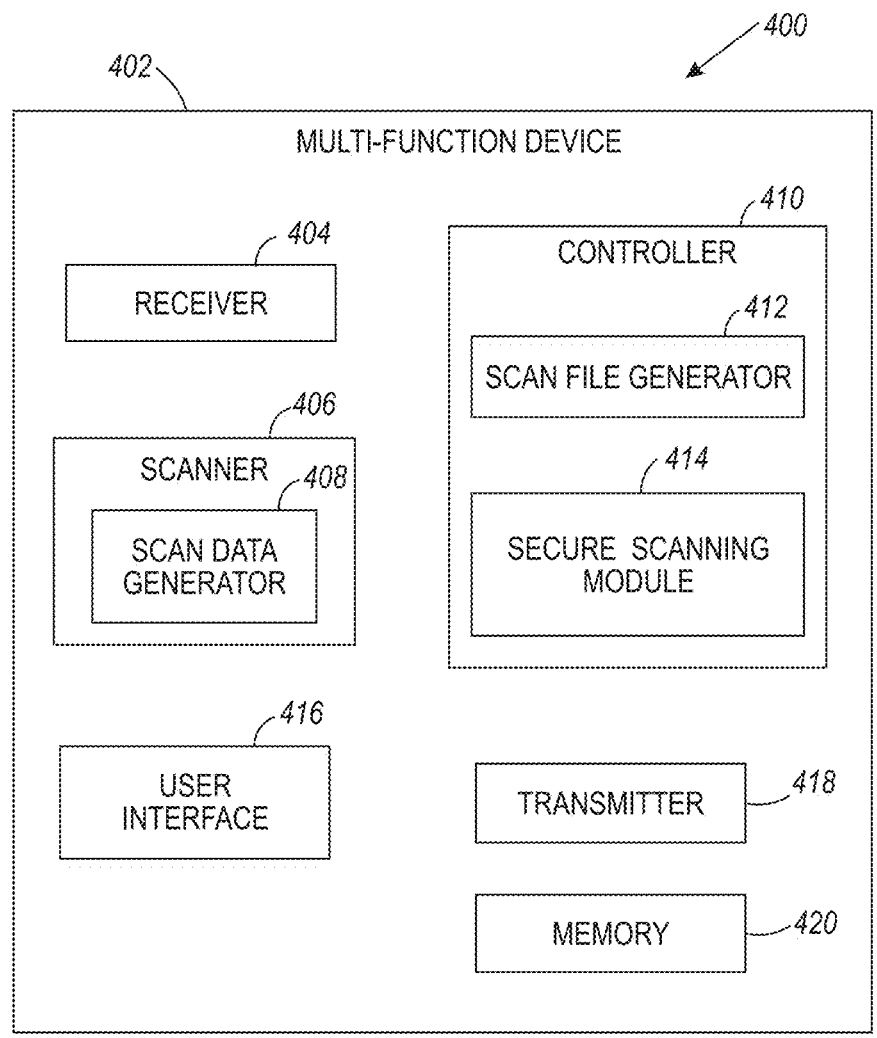
FIGS. 4A, 4B and 4C represent an overall system facilitating secure scanning.
Figure 4B:
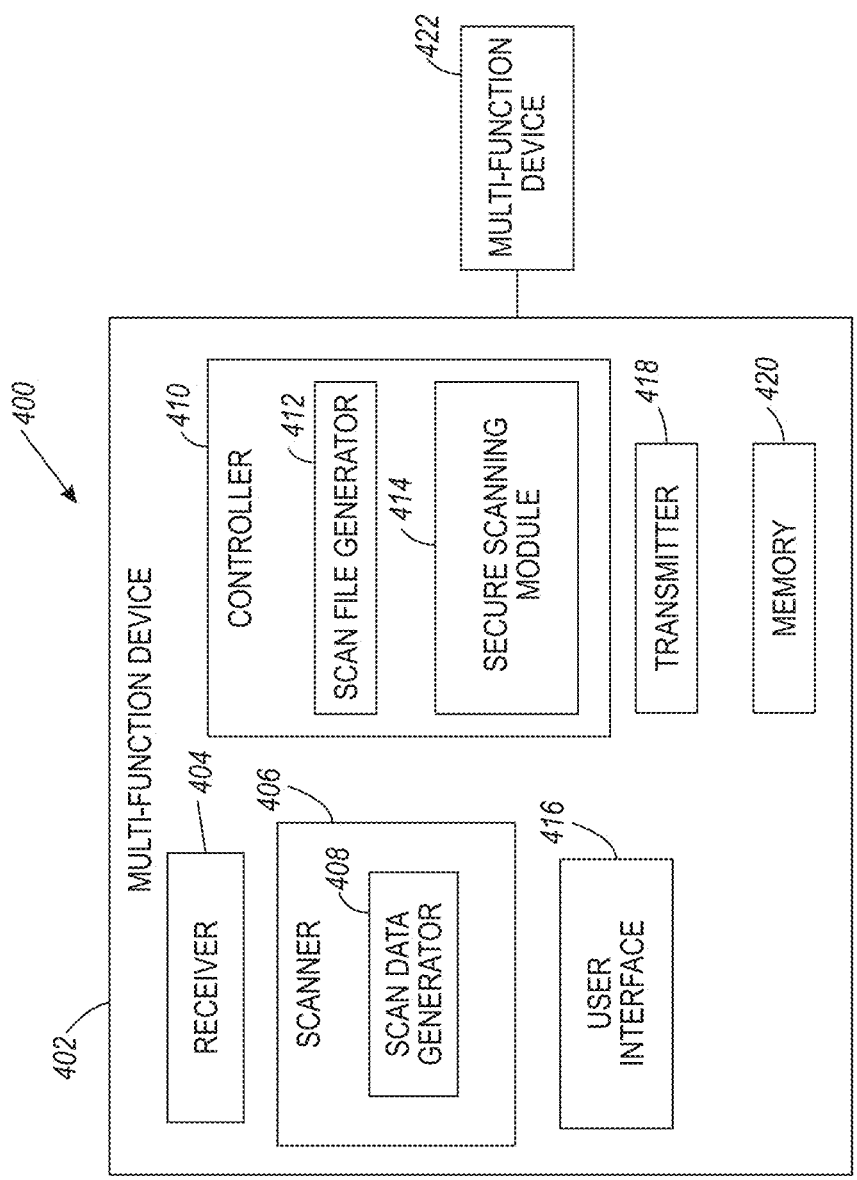

FIG. 4A shows an overall system 400 for protecting or securing scanned documents. As shown, the system 400 includes a multi-function device 402. The multi-function device 402 provides a secure scanning feature which can be enabled by a user at the multi-function device 402. Alternatively, the multi-function device 402 can have the secure scanning feature enabled by default. Enabling the secure scanning feature indicates that the user wishes to secure a document which is submitted for scanning.

The multi-function device 402 secures a document received for scanning by encoding content of the scanned document using an identity key pre-configured with the multi-function device 402, resulting in a secured scanned document. The process of securing the scanned document is completely an internal process handled by the multi-function device 402 and it does not require any authentication from the user. The internal process includes encoding content of the scanned document using an identity key so that the particular multi-function device which encodes the scanned document is able to decode it without any key/password. In this manner, the scanned document can only be accessed at/by the particular multi-function device such as the multi-function device 402 and limits access of the scanned document at the multi-function device 402 and does not allow access of the scanned document outside the multi-function device 402. In addition to the multi-function device 402, the scanned document can be accessed at one or more multi-function devices configured with the identity key, i.e., the identify key same as that of the multi-function device 402.

As illustrated in FIG. 4A, the multi-function device 402 includes a receiver 404, a scanner 406 having a scan data generator 408, a controller 410 having a scan file generator 412 and a secure scanning module 414, a user interface 416, a transmitter 418, and a memory 420. Each of the components 404-420 are coupled to each other via a communication bus or later developed protocols and each of the components communicate with each other for protecting/securing scanned documents. The multi-function device 402 may include one or more additional components as required to implement the present disclosure. The secure scanning module 414 is shown as a part of the controller 410 but the secure scanning module 414 may be a separate component or unit of the multi-function device 402.

The scanner 406 receives the document input by the user for scanning. The document includes confidential content. The content may be in the form of text, image, graphics or a combination thereof. Specifically, the receiver 404 receives the document for scanning. The scanner 406 may be an Automatic Document Feeder (ADF) or a flatbed scanner. The flatbed scanner includes a glass or a platen for receiving the document. In such cases, the receiver 404 may be a glass. In the flatbed scanner, the user first places front side of the document for scanning and manually flips and places the back side of the document for scanning. The ADF scanner includes an input tray for receiving the document for scanning. In case of ADF scanner, the receiver 404 may represent an input tray. The ADF scanner takes the document inside and automatically scans both sides of the document in a single pass. If the user scans the document using the flatbed scanner, then the front side and back side can be set manually by the user via the user interface 416. Else if the user scans the document using ADF, then the side of the document input first for scanning is considered as a front side and the other side is considered as a back side. These are just two examples, but other types of scanner may be used for implementing the present disclosure. Moreover, the type of scanner does not interfere while implementing the present disclosure.

Upon receiving the document, the controller 410 triggers the scan data generator 408. The scan data generator 408 generates an image of the document, i.e., generates an image data representing an image of the document. The scan data generator 408 reads the content, extracts the content using Optical Character Recognition techniques (OCR) and finally generates the image data representing the image of the document. The scan data generator 408 passes the image data to the controller 410 further processing.

The controller 410 receives the image data corresponding to the document and passes the image data to the scan file generator 412. The scan file generator 412 receives the image data along with any scanning information/details such as double sided-scanning, color, etc. The scan file generator 412 generates a scanned document. The controller 410 then checks whether the secure scanning feature is enabled by the user or is enabled otherwise. If the feature is enabled, the controller 410 recognizes that the scanned document requires protection. The controller 410 retrieves the identity key of the multi-function device 402. The controller 410 passes the scanned document and the identity key to the secure scanning module 414 for protecting/securing the scanned document.

The secure scanning module 414 receives the scanned document and the identity key. The secure scanning module 414 reads the content of the scanned document and encodes content of the scanned document with the identity key of the multi-function device 402, to protect the content of the scanned document. The secure scanning module 414 outputs a protected or secured scanned document. When the secured scanned document is accessed at the device 402, the secure scanning module 414 decodes the content of the scanned document using the identity key before providing access to the scanned document.

The secure scanning module 414 may include an encoder and a decoder. The encoder encodes the scanned document using the identity key as discussed above. The decoder decodes the scanned document using the identity key each time when the user accesses the scanned document. This is just one way; the functionalities of encoding and decoding may directly be incorporated in the secure scanning module 414.

The secured scanned document is passed to the controller 410. The controller 410 stores the secured scanned document in the memory 420 of the multi-function device 402 for later retrieval and access by the user or other users. In this manner, the scanned document is generated and secured using the identity key of the multi-function device 402. The stored scanned document can be accessed or retrieved for viewing and/or printing or the like. For example, the user may want to view the content of the secured scanned document later. In another example, the user may want to print the content of the secured scanned document later. In further example, the user may want to send the secured scanned document to another multi-function device (422, FIG. 4B) communicatively coupled to the multi-function device 402 via a network, for storage and/or later use.

Anytime later, the secured scanned document can be accessed at the multi-function device 402, i.e., the multi-function device which protects the scanned document or at a different multi-function device (such as 422) which is configured with the same identity key as of the multi-function device 402. By protecting/securing the scanned document, the multi-function device 402 limits access of the scanned document either to/at the multi-function device 402 or at different multi-function device (such as 422) configured with the same identify key as of the multi-function device 402.

Continuing with the description of system components, the user interface 416 displays details such as scan settings, an option to modify scan settings or other information relevant for displaying to the user, and so on. In context of the present disclosure, the user interface 416 allows the user to select or enable a secure scanning feature. In some embodiments, the user interface 416 may be used for modifying the identity key configured with the multi-function device 402 by admin users.

The memory 420 stores the scanned document for later retrieval and access such as displaying and/or printing. The stored scanned document can be accessed by the user later. The memory 420 further stores the identity key associated with the multi-function device 402 and other details relevant for the present disclosure.

The transmitter 418 sends the scanned document to one or more multi-function devices (say multi-function device 422) for storage and/or use, communicatively coupled to the multi-function device 402. Access to content of the scanned document is allowed at the one or more multi-function devices, if the one or more multi-function devices are configured with the identity key. Before providing/allowing access, the one or more multi-function devices decode the content of the scanned document using the unique identity key, if the one or more multi-function devices are configured with the identity key. Access to content of the scanned document is disallowed at the one or more multi-function devices, if the one or more multi-function devices are not configured with the identity key. The one or more multi-function devices display a message if access to the content of the scanned document is disallowed. The message indicates that content of the scanned document cannot be accessed or is not available for display.

One such multi-function device of the one or more multi-function devices is shown in FIG. 4B as 422. According to FIGS. 4A and 4B, it is considered that the multi-function device 402 transmits the scanned document to the multi-function device 422. The multi-function device 402 is considered as a first multi-function device and the multi-function device 422 is referred to as a second multi-function device. The second multi-function device 422 as shown in FIG. 4B has same structural and functional details as of the first multi-function device 402. The second multi-function device 422 includes all components such as 404-420. The second multi-function device 422 is configured with the identity key which is same as that of the identity key configured with the multi-function device 402. For the sake of discussion, the multi-function device 422 includes a receiver, a memory and a controller (although not shown).

The receiver receives the secured scanned document. Upon receiving the scanned document, the controller checks whether the multi-function device 422 is configured with the same identity key as of the multi-function device 402. Based on the check, the controller decodes the content of the scanned document using the unique identity key, if the multi-function device 422 is configured with the identity key. The controller allows access to content of the scanned document at the multi-function device 422 only when the multi-function device 422 decodes the content of the secured scanned document successfully. For example, the multi-function device 422 displays the content of the secured scanned document only when the second multi-function device 422 decodes the content of the secured scanned document successfully. In another example, the multi-function device 422 prints the content of the secured scanned document only when the multi-function device 422 decodes the content of the secured scanned document successfully.

The multi-function device 422 disallows access to content of the scanned document at the multi-function device 422, if the multi-function device 422 is not configured with the identity key. In such cases, the multi-function device 422 displays a pre-defined message to the user indicating the access is denied.

The controller stores the secured scanned document at the multi-function device 422 or in a memory of the multi-function device 422.

The multi-function device 402 can be considered as a first multi-function device and the multi-function device 422 can be considered as a second multi-function device. The multi-function device 422 represents another multi-function device and may further represent one of the one or more multi-function devices.

The second multi-function device 422 may not necessarily be communicatively coupled to the device 402. In such cases, the scanned document is received by the second multi-function device through means such as via user email through external device. Upon receiving, the same process can be implemented as discussed above.

Figure 4C:
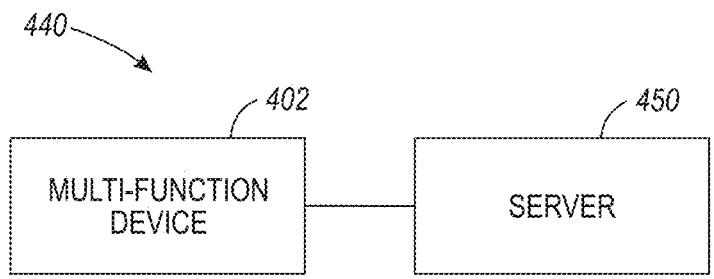

The implementations shown in FIGS. 4A, 4B, and 4C are exemplary in nature. There can be many other variations to the implementations and the system can be implemented in any form.

Exemplary Scenarios

A few exemplary case scenarios are discussed. A scanned document is protected using the multi-function device 402 and can be accessed later anytime. In one scenario, it can be considered that the user wishes to access the content of the scanned document at the same multi-function device that encodes the scanned document, i.e., the multi-function device 402.

In one example, it is considered that the user wishes to view content of the scanned document. The user approaches the multi-function device 402 and access the user interface 416 for selecting the scanned document. Once the user selects the scanned document, the multi-function device 402 receives a request from the user to access the scanned document. The multi-function device 402 or the controller 410 checks whether the scanned document is secured. The multi-function device 402 then checks and retrieves the identity key configured with the multi-function device 402 and decodes the scanned document using the identity key. When the scanned document is decoded using the identity key, the multi-function device 402 provides access to content of the scanned document and displays content of the scanned document to the user. In this manner, the multi-function device 402 allows access of the scanned document at the multi-function device 402.

In cases when the user wishes to print content of the scanned document. The user uses the multi-function device 402 and access the user interface 416 for selecting the scanned document. Once the user selects the scanned document, the multi-function device 402 receives a request from the user to print the scanned document. The multi-function device 402 or the controller 410 checks whether the scanned document is secured. The multi-function device 402 then checks and retrieves the identity key configured with the multi-function device 402 and decodes the scanned document using the identity key. When the scanned document is decoded using the identity key, the multi-function device 402 accesses content of the scanned document and displays content of the scanned document to the user. The multi-function device 402 provides access content of the scanned document and prints the scanned document for the user. In this manner, the multi-function device 402 allows access of the scanned document at the multi-function device 402.

In another scenario, it can be considered that the user wishes to access the content of the scanned document at a different multi-function device, i.e., device 422. The scanned document can be directly transmitted to the device 422 through 402. In some cases, the user may have the secured scanned document in his email, personal storage device and so on and the user submits the secured scanned document for access. Once the user selects the scanned document, the multi-function device 442 receives a request from the user to access the scanned document. The multi-function device 422 or the controller checks whether the scanned document is secured. The multi-function device 422 then checks and retrieves the identity key configured with the multi-function device 422 and decodes the scanned document using the identity key. When the scanned document is decoded using the identity key, the multi-function device 422 provides access to content of the scanned document and displays content of the scanned document to the user. In this manner, the multi-function device 422 allows access of the scanned document at the multi-function device 422.

Once access to the content is allowed, content can be displayed and/or printed.

The functionalities for protecting the scanned document are implemented by the multi-function device or one or more of its components as discussed above. It must be noted that the functionalities for protecting the scanned document can be incorporated in a server (although not shown). In such cases, a system 440 having a multi-function device 402 and a server 450 is provided. The multi-function device 402 generates the scanned document and passes the scanned document along with the identity key of the multi-function device 402 to the server 450 for protecting/securing the scanned document. The server 450 receives the scanned document from the multi-function device 402 and encodes the content of the scanned document using the identity key of the multi-function device 402. The server 450 allows access to the content of the scanned document when the scanned document is accessed at the multi-function device 402. Further before providing access to the content of the scanned document at the multi-function device 402, the server 450 checks whether the multi-function device 402 is configured with the identity or not. Based on the check, the server 450 decodes the content of the scanned document and further allows access to the content of the scanned document. The content of the scanned document is displayed at the multi-function device 402. In case, the server 450 finds that the multi-function device 402 is not configured with the identity key, the server 450 disallows the access to the content of the scanned document and displays a message related to "no access" to the user at the multi-function device 402. The server 450 allows access to the content of the scanned document when the scanned document is accessed at a different multi-function device configured with the identity key.

Exemplary Flowcharts

Securing Scanned Document

Figure 5:
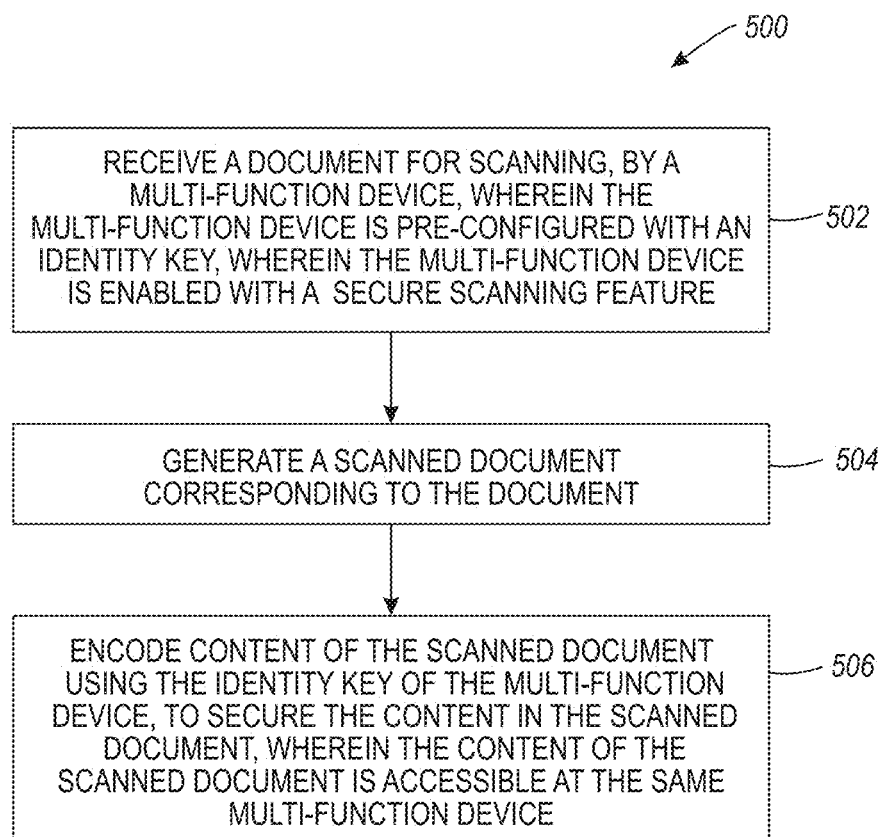
FIG. 5 is a method flowchart for providing secure scanning for a scanned document.

FIG. 5 is a method flowchart 500 for securing a scanned document to enhance security for the scanned document including confidential content. Specifically, the method 500 provides a secure scanning, where the scanned document is secured using/with an identity key. The method can be implemented by a multi-function device such as 100, or one or more components of the multi-function device 100. It can be considered that the multi-function device 100 includes a secure scanning feature and the feature is enabled at the multi-function device 100. The multi-function device 100 that protects/secures the scanned document can be referred to as a first multi-function device.

The method begins with configuring the multi-function device 100 with an identity key. The multi-function device 100 may be configured with the identity key at the time of manufacturing or may be configured later. The identity key is set/fused as a part of software of the multi-function device 100. As an example, the identity key may be added in printer software configuration settings at the time of manufacturing. The identity key may be configured/set by a manufacturer of the multi-function device 100, an owner of the multi-function device 100 or an admin user. The identity key may be managed by any of these parties. The identity key may be changed when required. The identity key is a key that identifies the multi-function device 100 or an environment where the multi-function device 100 is present for scanning the document. The identity key is used by the multi-function device 100 for securing any document received for scanning. The identity key may be a device identifier such as a serial number, MAC address or organization network ID/domain or a combination thereof. The identity key is known by devices such as the multi-function device 100, a group of other multi-function devices configured with the identity key or admin users, hence, chances of leakage of the identity key are reduced.

At 502, a document for scanning is received, by the multi-function device 100, the document includes confidential data. The multi-function device 100 is pre-configured with the identity key and the multi-function device 100 is enabled with a secure scanning feature. A scanning process is initiated. Upon scanning, an image data representing an image of the document is generated. Based on the image data, a scanned document is generated at 504. In simple words, a scanned document is generated corresponding to the document. At 506, content of the scanned document is automatically encoded using the identity key of the multi-function device 100, to secure the content in the scanned document. The content of the scanned document may be encoded at the time of generating the scanned document or after the scanned document is generated. The content of the scanned document is encoded such that the content of the scanned document is accessible at the same multi-function device, i.e., multi-function device 100. The content of the scanned document is accessible at a different multi-function device but configured with the same identity key.

Once the scanned document is generated and encoded, the scanned document is stored for later retrieval and/or access. The scanned document may be stored in a memory of the multi-function device 100. The scanned document may be stored in an external storage device such as a server, a database, a personal storage device, for example, a pen drive, hard disk, and so on. The scanned document may be sent to a pre-defined destination as specified by the user such as a pre-defined folder, a server, a personal storage device, an email, etc., for storage and/or later access. The scanned document may directly be sent to one or more multi-function devices for storage and/or later access such as view and printing.

When the scanned document is accessed at the multi-function device 100 then access to content of the scanned document is allowed at the multi-function device 100 as the multi-function device 100 is configured with the identity key used for encoding. Before allowing access, the content of the scanned document is decoded using the unique identity key. As a result, content is displayed to the user. The user can view the content and/or may print the content as required.

When the scanned document is accessed at a different multi-function device, access to the content of the scanned document is allowed when the different multi-function device is configured with the same identity key. As a result, content is displayed to the user. The user can view the content and/or may print the content as required.

Else, access to the content of the scanned document is disallowed, when a different multi-function device is not configured with the same identity key or is configured with a different identity key.

The scanned document is transmitted to one or more multi-function devices for storage and/or later access such as viewing or printing. The scanned document is received by the one or more multi-function devices. A user of the one or more multi-function devices tries to access the scanned document using the one or more multi-function devices. Before providing access, it is checked whether the one or more multi-function devices are configured with the same identity key as of the multi-function device 100. If the one or more multi-function devices are configured with the same identity key, the content of the scanned document is decoded using the identity key. Once decoded, access to the content of the scanned document is allowed at the one or more multi-function devices. As a result, the content of the scanned document is displayed for viewing or for printing purpose. If the one or more multi-function devices are not configured with the same identity key, access to the content of the scanned document is disallowed at the one or more multi-function devices. As a result, a message is displayed to the user when access to the content of the scanned document is disallowed. The message can be a pre-defined message such as "no access to the document."

Accessing Secured Scanned Document

Figure 6:
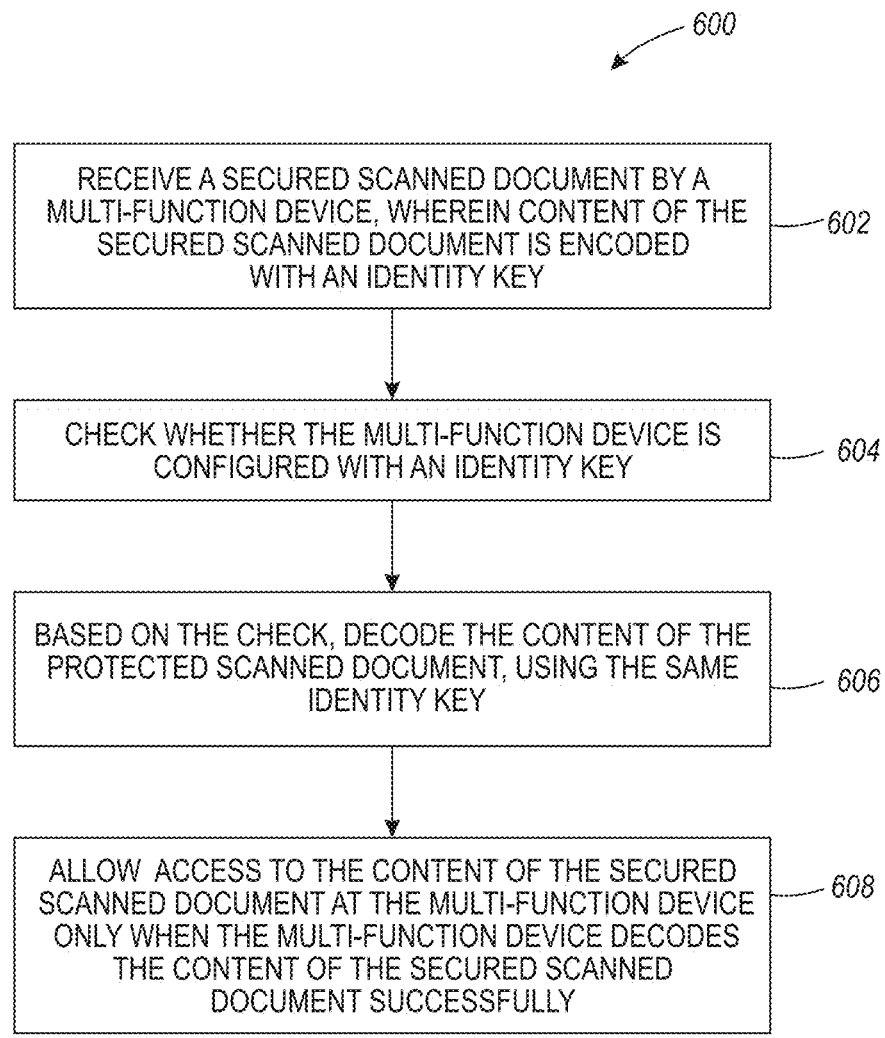
FIG. 6 is a flowchart for accessing a secured scanned document.

FIG. 6 is a method flowchart 600 for accessing a secured scanned document. The method is implemented when the multi-function device 100 transmits the secured scanned document to other one or more multi-function devices. For the sake of discussion, the secured scanned document is transmitted to a single multi-function device, may be referred to as a second multi-function device. To further elaborate the flowchart, it can be considered that the scanned document is shared with another multi-function device, i.e., a second multi-function device located remotely from the first multi-function device 100. The first multi-function device 100 and the second multi-function device are a part of a shared network. The scanned document is secured using the identity key of the multi-function device 100 as discussed in flowchart 500 above.

At 602, the method begins with receiving a secured/protected scanned document by the multi-function device (the second multi-function device), wherein content of the secured scanned document is encoded with the identity key. The secured scanned document is stored at the multi-function device for records and/or later retrieval. When a user of the multi-function device tries to access the secure document for viewing or for printing, the blocks 604-608 are implemented.

At 604, It is checked whether the multi-function device is configured with an identity key. It is further checked whether the identity key configured with the multi-function device is same as the identity key which is used for encoding the scanned document.

Based on the check, the content of the protected/secured scanned document is automatically decoded by the multi-function device, using the identity key at 606. As an example, if the identity key configured with the multi-function device is same as the identity key which is used for encoding the scanned document, the content of the scanned document is decoded. At 608, access to the content of the secured scanned document is allowed at the multi-function device only when the multi-function device decodes the content of the secured scanned document successfully. Once decoded successfully, the content of the secured scanned document is printed when the secured scanned document is decoded. Or The content of the secured scanned document is displayed for viewing when the secured scanned document is decoded successfully.

If the multi-function device is not pre-configured with the same identity key, access to the content of the secured scanned document is disallowed. In this manner, the scanned document secured/protected by the multi-function device 100 can be accessed at a different multi-function configured with the identity key.

Figure 7:
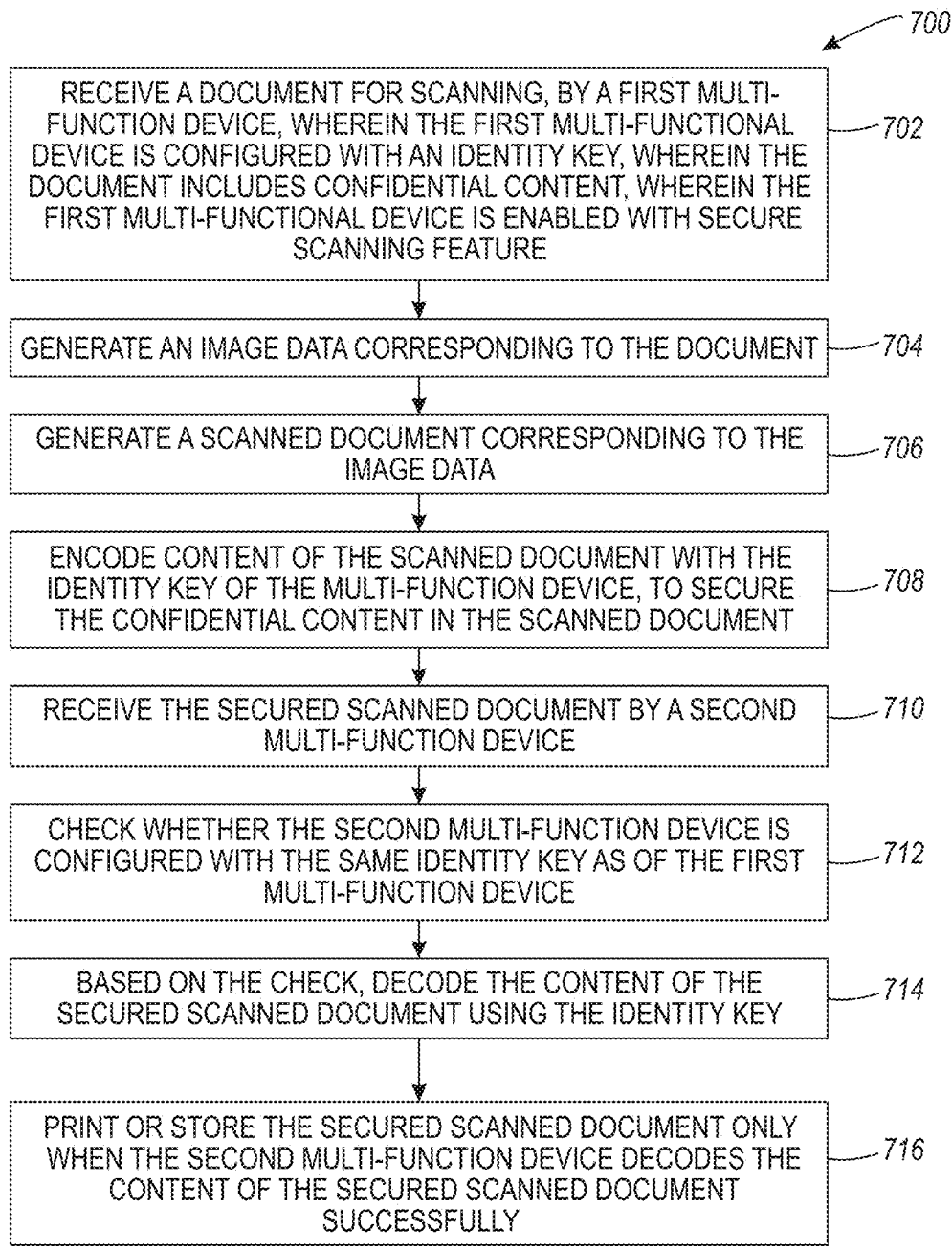
FIG. 7 is a complete detailed method for implementing the present disclosure.

FIG. 7 is a detailed method flowchart 700 according to an implementation of the present disclosure.

At 702, a document for scanning is received, by a first multi-function device, wherein the document includes confidential content, wherein the first multi-function device is configured with an identity key and is enabled with secure scanning feature. At 704, an image data corresponding to the document is generated. At 706, a scanned document corresponding to the image data is generated. The scanned document is encoded. Specifically, at 708, content of the scanned document is encoded with the identity key of the multi-function device. Encoding the content of the scanned document secures the confidential content of the scanned document and prevents unauthorized access to the scanned document. The secured scanned can be stored at the first multi-function device. The secured scanned can be transmitted to a second multi-function device by the first multi-function device. Alternatively, the secured scanned document is otherwise submitted to the second multi-function device. For example, the user may have the secured scanned document in his personal storage device, email, and so on.

At 710, the secured scanned document is received by the second multi-function device. The second multi-function device recognizes that the received scanned document is a secured scanned document. The secured scanned document can be stored at the second multi-function device. At 712, it is checked whether the second multi-function device is configured with the same identity key as of the first multi-function device. At 714, based on the check, decode the content of the secured scanned document using the identity key. For example, if the second multi-function device is configured with the same identity key as of the first multi-function device, then the second multi-function device decodes the content of the scanned document successfully. Consequently, access to the content of the secured scanned document is provided. In case the second multi-function device is not configured with the same identity key, access to the content of the secured scanned document is not provided. Once decoded successfully, at 716, the secured scanned document is printed or stored successfully. Or the secured scanned document is displayed at the multi-function device.

The flowcharts 500, 600 and 700 can be implemented in the form of a non-transitory computer-readable medium comprising instructions executable by a processing resource.

For clarity, the terms and definitions are outlined here. A multi-function device that encodes the scanned document can be considered as a first multi-function device. When a user tries to access the secured scanned document at the first multi-function device, all method blocks (such as checking the identity key, allowing access, disallowing access, displaying, printing, etc.) are implemented by the first multi-function device. When a user wishes to access the secured scanned document at a different multi-function device, the different multi-function device is referred to as a second multi-function device, all method blocks (such as checking the identity key, allowing access, disallowing access, displaying, printing, etc.) are implemented by the second multi-function device.

Further, the scanned document generated/mentioned by/in the present disclosure is a secured scanned document. The secured scanned document can be referred to as encoded scanned document. The secured scanned document is encoded using an identity key of a multi-function device, the same identity key is required to decode and finally access the secured scanned document. The multi-function device has the same identity key or a different multi-function device may have the same identity key.

It may be noted that a user who accesses the document for viewing and/or printing at later stages can be the same user who submitted the document for scanning or it can be a different user. For example, a user who submits the document for scanning can be a customer and later the corresponding scanned document is accessed by another user such as a bank staff. In another example, a user who submits the document for scanning can be a bank staff and later the corresponding scanned document is accessed by another bank staff member. In further example, a user who submits the document for scanning can be a bank staff and later the corresponding s scanned document is accessed by the same bank staff member. The aspect of the same user or different user does not interfere while implementing the present disclosure. The aspect of same multi-function device or different multi-function device does not interfere while implementing the present disclosure. It is understood that the present disclosure covers all possible variations of the duplex scanning information, the user and the multi-function device.

Exemplary Scenario

For better understanding, an example is discussed without limiting the scope of the disclosure. It can be considered that a multi-function device (machine 1) is configured with an identity key such as an organization name of the multi-function device. The multi-function device receives a document for scanning. The document includes confidential data such bank account history. A user such as bank staff uses a multi-function device for scanning. The multi-function device scans the document and automatically encodes the document with the configured identity key such that the scanned document can only be accessed at the multi-function device. Later when the user wishes to access the scanned document, the user can select the scanned document from the memory of the multi-function device (machine 1) and can access, i.e., view the content of the scanned document and/or print the content of the scanned document.

In one scenario, it is considered that the bank staff sends the scanned document to a second bank staff person in another bank branch at a different location. The second bank staff person receives the scanned document via email, or directly at a different multi-function device (machine 2) present in his branch configured with the identity key. The second bank staff person uses the multi-function device present in his branch to access the scanned document configured with the identity key. When the second bank staff person accesses the received scanned document, the user is able to access the content of the scanned document as the machine 2 is configured with the same identity key.

In another scenario, it is considered that the bank staff sends the scanned document to another user outside the bank. The user receives the scanned document but is not able to access the content of the scanned document. As the scanned document is encoded and to decode the content of the scanned document, machine 1 configured with the identity key is required. Or machine 2 configured with the same identity key is required.

In this manner, the scanned document protected using the present methods and systems remains always secure and thus offers an enhanced level security to all scanned documents.

The present disclosure provides methods and systems for protecting a scanned document using an identity key configured with a multi-function device. To access the scanned document, a multi-function device configured with the identity key is required. The identity key is configured at multi-function devices or only known to admin users. Even if the admin users know the identity key, the admin users still cannot access content of the scanned document, i) as the identity key does not act as a password to access the content, and ii) as the scanned document cannot be accessed outside the multi-function device. Instead, the identity key needs to be configured at the multi-function device or any equivalent device. In this manner, the scanned document can only be accessed within an organization and cannot be misused by any other user outside the organization. The documents scanned using the present methods and systems remain secure all the times. The methods and systems do not require any password for accessing the scanned document and hence no effort or input from the user is required to access the secured scanned document. The methods and systems don't require any hardware changes and thus is easy from implementation perspective. In all, access and use of the scanned document is restricted to the device, thereby offering an enhanced security mechanism for scanned documents including confidential data. For example, the document scanned from a multi-function device cannot be printed in another environment as the scanned document is locked to the device.

The methods and systems propose a new way of protecting document which are scanned by a multifunction device. The scanned documents are encoded with particular device identity such that users cannot use scanned documents other than particular multi-function device.

The methods and systems discussed above can be implemented using any hardware machine or a device such as a multi-function device or an equivalent device. The multi-function device can include a number of components as discussed above or may include additional components required for implementing the current disclosure.

For a person skilled in the art, it is understood that the use of phrase(s) "is," "are," "may," "can," "could," "will," "should," or the like, is for understanding various embodiments of the present disclosure and the phrases do not limit the disclosure or its implementation in any manner.

It is emphasized that the term "comprises," or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "scanning," or "configuring," or "storing," or "encoding," or "generating," or "receiving," "or transmitting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for providing a secure scanning on a multi-function device, the method comprising:
   receiving a document for scanning, by the multi-function device, wherein the multi-function device is configured with an identity key common to a device group comprising the multi-function device, and a secure scanning feature configured to use the identity key to encode content decodable by a member of the device group using the identity key, and the identity key identifies the device group;
   generating, using the multi-function device, an image data corresponding to the document;
   generating, using the multi-function device, a scanned document corresponding to the image data; and
   encoding, using the multi-function device, content of the scanned document using the identity key, to secure the content in the scanned document, wherein the encoded content of the scanned document is inaccessible outside the device group.

2. The method of claim 1, further comprising configuring, using the multi-function device, the identity key at a time of the multi-function device being manufactured or a predefined software being installed on the multi-function device.

3. The method of claim 1, further comprising storing, using the multi-function device, the secured scanned document for later retrieval and/or access.

4. The method of claim 1, further comprising decoding, using the multi-function device, the encoded content of the scanned document at the multi-function device using the identity key.

5. The method of claim 1, further comprising transmitting, using the multi-function device, the scanned document to one or more multi-function devices belonging to the device group.

6. The method of claim 5, further comprising decoding using the identity key, by the one or more multi-function devices, the content of the scanned document encoded with the identity key.

7. The method of claim 5, further comprising transmitting, using the multi-function device, the scanned document to one or more non-member multi-function devices outside the device group, wherein the one or more non-member multi-function devices are not configured with the identity key.

8. The method of claim 7, further comprising displaying, using the one or more non-member multi-function devices, a message that access to the encoded content of the scanned document is disallowed.

9. The method of claim 1, wherein the device group is characterized by one or more of a shared environment, a shared location, and a shared organization.

10. The method of claim 1, wherein the device group comprises more than one multi-functional device.

11. A method for accessing a secured scanned document, the method comprising:
   receiving a secured scanned document by a multi-function device, wherein content of the secured scanned document is encoded with an identity key that identifies a device group comprising another multi-function device, wherein the other multi-function device encoded the content, and the identity key is common to the device group;
   checking, using the multi-function device, whether the multi-function device is preconfigured with the identity key;
   based on the checking, decoding using the identity key, by the multi-function device, the encoded content of the secured scanned document; and
   allowing, using the multi-function device, access to the content of the secured scanned document at the multi-function device only when the multi-function device decodes the content of the secured scanned document successfully.

12. The method of claim 11, further comprising printing, using the multi-function device, the content of the secured scanned document based on the secured scanned document being decoded successfully.

13. The method of claim 11, further comprising displaying, using the multi-function device, the content of the secured scanned document based on the secured scanned document being decoded successfully.

14. The method of claim 11, further comprising storing, using the multi-function device, the secured scanned document at the multi-function device.

15. The method of claim 11, wherein the device group is characterized by one or more of a shared environment, a shared location, and a shared organization.

16. A multi-function device providing a secure scanning, comprising:
   a user interface provided to a user, for enabling a secure scanning feature;
   a scanner comprising a scan data generator being configured for generating an image data upon scanning a document; and
   a controller in communication with the scanner, the controller being configured for accessing an identity key common to a device group comprising the multi-function device and that identifies the device group, wherein the controller comprises:
      a scan file generator configured for generating a scanned document corresponding to the image data generated by the scanner, and
      a secure scanning module configured for encoding a content of the scanned document with the identity key, wherein the content of the scanned document is accessible at the multi-function device or at a different multi-function device preconfigured with the identity key.

17. The multi-function device of claim 16, further comprising a memory for storing the scanned document for later retrieval and/or access.

18. The multi-function device of claim 16, wherein the secure scanning module is further configured to decode the encoded content of the scanned document using the identity key.

19. The multi-function device of claim 16, further comprising a transmitter configured to transmit the scanned document to one or more multi-function devices belonging to the device group and communicatively coupled to the multi-function device.

20. The multi-function device of claim 19, wherein the one or more multi-function devices are configured to decode the content of the scanned document encoded with the identity key, wherein the encoded content is decoded using the identity key.

21. The multi-function device of claim 19, wherein the transmitter is further configured to transmit the scanned document to one or more non-member multi-function devices outside the device group, wherein the one or more non-member multi-function devices are not configured with the identity key.

22. The multi-function device of claim 21, wherein the one or more non-member multi-function devices are configured to display a message that access to the encoded content of the scanned document is disallowed.

23. The multi-function device of claim 16, wherein the device group is characterized by one or more of a shared environment, a shared location, and a shared organization.

24. The multi-function device of claim 16, wherein the device group comprises more than one multi-functional device.

25. A multi-function device for accessing a secured scanned document, the multi-function device comprising:
   a receiver configured for receiving a secured scanned document, wherein a content of the secured scanned document is encoded with an identity key that identifies a device group comprising another multi-function device, wherein the other multi-function device encoded the content, and the identity key is common to the device group; and
   a controller in communication with the receiver, the controller being configured for:
      checking whether the multi-function device is configured with the identity key,
      based on the checking, decoding the encoded content of the secured scanned document using the identity key, and
      allowing access to the content of the secured scanned document at the multi-function device only when the controller decodes the encoded content of the secured scanned document successfully.

26. The multi-function device of claim 25, wherein the controller is further configured to allow printing the content of the secured scanned document based on the secured scanned document being decoded successfully.

27. The multi-function device of claim 25, wherein the controller is further configured to display the content of the secured scanned document via a user interface based on the secured scanned document being decoded successfully.

28. The multi-function device of claim 25, further comprising a memory for storing the secured scanned document at the multi-function device.

29. The multi-function device of claim 25, wherein the device group is characterized by one or more of a shared environment, a shared location, and a shared organization.

30. A system, comprising:
a first multi-function device configured with an identity key common to a device group comprising the first multi-function device, and a secure scanning feature configured to use the identity key to encode content decodable by a member of the device group using the identity key, wherein the identity key identifies the device group, and the first multi-function device is further configured for:
generating a scanned document corresponding to a document received for scanning,
encoding a content of the scanned document with the identity key to secure the content in the scanned document, thereby providing a secured scanned document, and
transmitting the secured scanned document for at least one of storage and later access; and
a second multi-function device in communication with the first multi-function device, the second multi-function device comprising printing, scanning, and copying functions, wherein the second multi-function device belongs to the device group and is configured for:
receiving the secured scanned document transmitted from the first multi-function device,
checking whether the second multi-function device is preconfigured with the identity key as of the first multi-function device,
based on the checking, decoding the encoded content of the secured scanned document, wherein the encoded content is decoded using the identity key, and
allowing access to the content of the secured scanned document at the second multi-function device only when the content of the secured scanned document is decoded successfully.

31. The system of claim 30, wherein the second multi-function device is further configured for displaying the content of the secured scanned document only when the second multi-function device decodes the encoded content of the secured scanned document successfully.

32. The system of claim 30, wherein the second multi-function device is further configured for printing the content of the secured scanned document only when the second multi-function device decodes the encoded content of the secured scanned document successfully.

33. The system of claim 30, wherein the device group is characterized by one or more of a shared environment, a shared location, and a shared organization.

34. A system comprising:
a multi-function device configured with an identity key common to a device group comprising the multi-function device, and a secure scanning feature configured to use the identity key to encode content decodable by a member of the device group using the identity key, and the identity key identifies the device group, and the multi-function device is further configured for:
receiving a document for scanning,
generating an image data corresponding to the document, and
generating a scanned document corresponding to the image data; and
a server communicatively coupled to the multi-function device, the server is being configured for:
receiving the scanned document from the multi-function device,
upon receiving, encoding a content of the scanned document using the identity key to secure the content in the scanned document, and
allowing access to the content of the scanned document based on the scanned document being accessed at the multi-function device.

35. A non-transitory computer-readable medium comprising computer-executable instructions for providing a secure scanning of a document, the non-transitory computer-readable medium comprising instructions to:
receive a document for scanning using a multi-function device configured with an identity key common to a device group comprising the multi-function device, and a secure scanning feature configured to use the identity key to encode content decodable by a member of the device group using the identity key, wherein the identity key identifies the device group;
generate an image data corresponding to the document;
generate a scanned document corresponding to the image data; and
encode a content of the scanned document using the identity key to secure the content in the scanned document, wherein the encoded content of the scanned document is inaccessible outside the device group.

* * * * *